INVENTORS
Clifford A. Rowley
Joseph A. Reece
BY C.A. Rowley
ATTORNEY

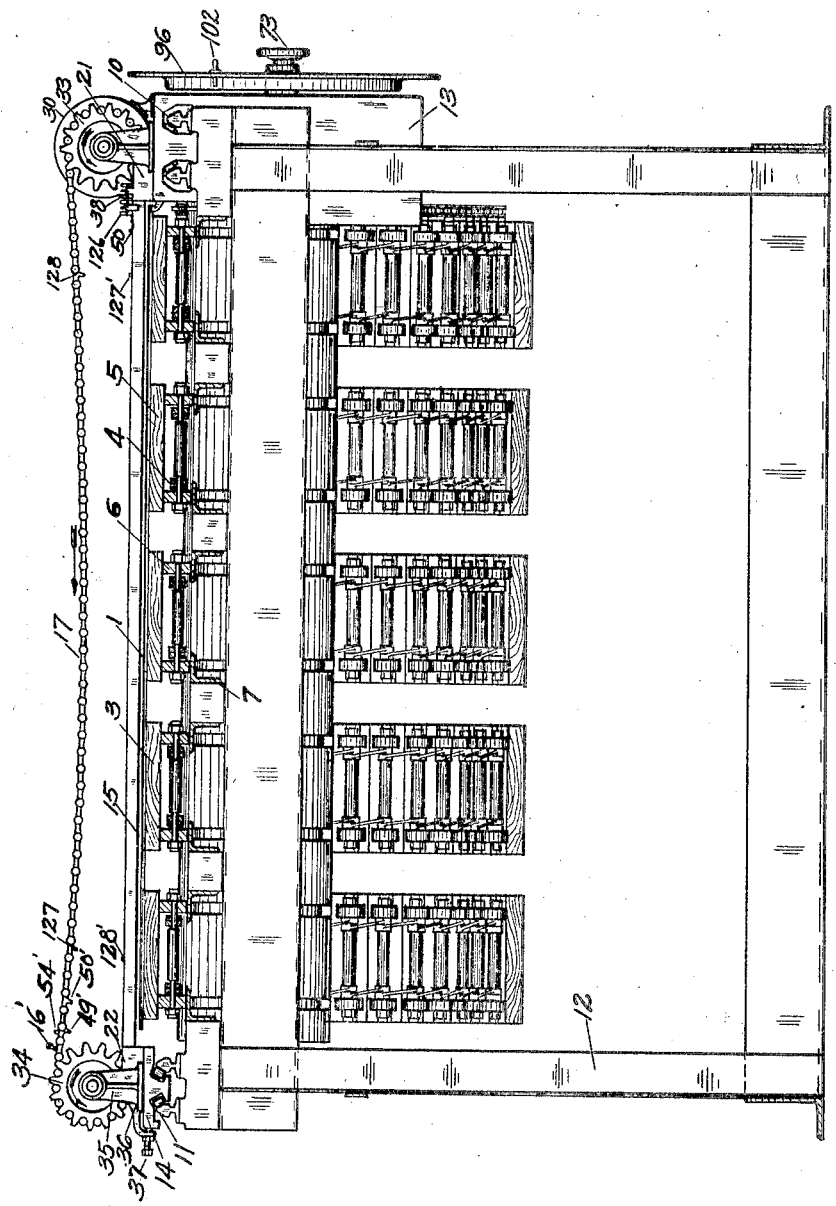

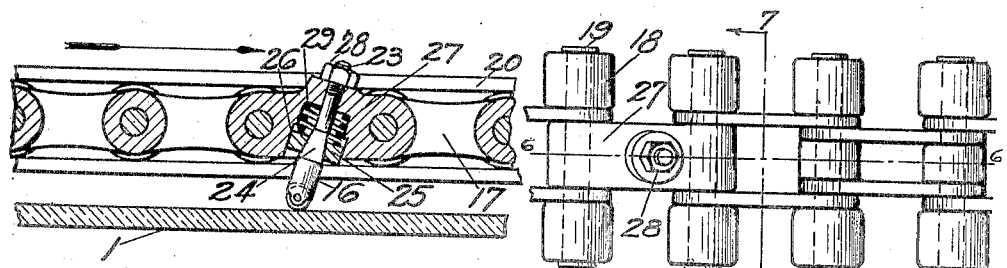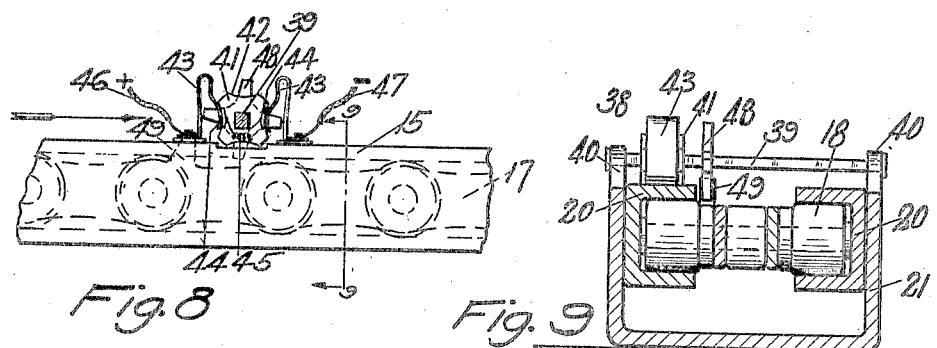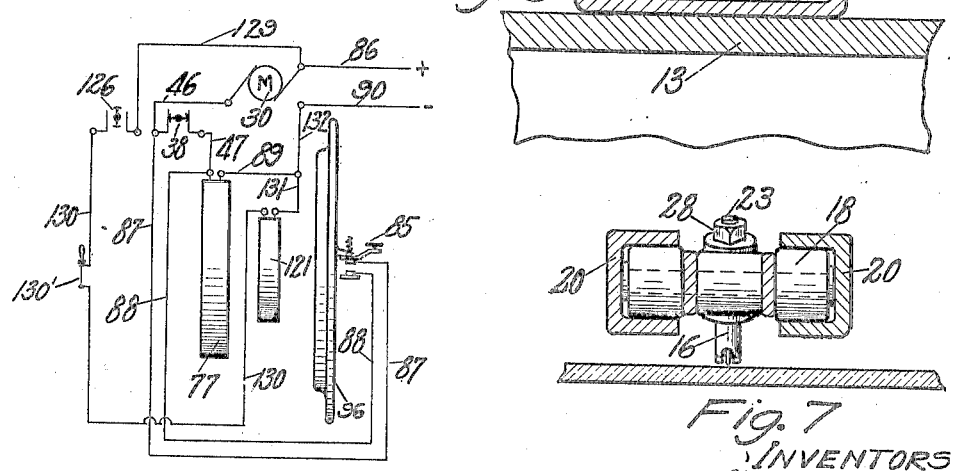

Patented May 1, 1923.

1,453,856

UNITED STATES PATENT OFFICE.

CLIFFORD A. ROWLEY AND JOSEPH A. REECE, OF TOLEDO, OHIO, ASSIGNORS TO THE LIBBEY-OWENS SHEET GLASS COMPANY, OF TOLEDO, OHIO, A CORPORATION OF OHIO.

APPARATUS FOR CUTTING SHEET GLASS.

Application filed February 4, 1922. Serial No. 534,235.

*To all whom it may concern:*

Be it known that we, CLIFFORD A. ROWLEY and JOSEPH A. REECE, citizens of the United States, residing at Toledo, in the county of Lucas and State of Ohio, have invented new and useful Improvements in Apparatus for Cutting Sheet Glass, of which the following is a specification.

This invention relates to an apparatus for cutting or scoring transversely, at intervals, a continuously drawn sheet of glass.

In certain systems of producing sheet glass, a continuous flat sheet of glass is drawn from a molten source, and passed through a horizontal leer. An example of such a sheet drawing system is shown in the patent to Colburn, 1,248,809, granted Dec. 4, 1917. The continuous sheet of glass emerges from the leer onto a moving table or conveyor, known as the "cutting table", and while on this table is cut into sections, which are washed and carried away to the cutting rooms. This dividing of the continuous sheet into sections is usually performed with a hand-operated cutting-tool, which is drawn across the sheet at intervals. These score lines are seldom accurately straight or perpendicular to the line of travel of the sheet. The distance between score lines is also only roughly measured, so that there is considerable waste at the ends when the sheet sections are afterwards accurately cut down to the desired sheet sizes.

One object of the present invention is to produce an apparatus for accurately scoring the sheet along straight transverse lines, perpendicular to the direction of travel of the sheet.

Another object of the invention is to provide a normally automatic cutting device of this nature.

Another object is to provide an automatic cracking-off device, operated by the cutter, for severing the sheet on the scored lines.

Another object is to provide an automatic measuring or score-timing device, whereby score lines may be accurately spaced at any desired distance apart.

Another object is to provide a timing device of this nature that may be adjusted or reset to change the size of sheets being cut without halting the operation of the machine.

Another object is to provide means for manually starting the operation of the cutter at any time, to cut strips of any length from the sheet, without disturbing the automatic measuring device, which will automatically resume its measuring operations from the last made score line.

Other objects and advantages of the invention will become apparent from the following detailed description of one embodiment thereof.

In the accompanying drawings:

Fig. 4 is a vertical transverse section through the cutting-table showing the cutting-apparatus in side elevation.

Fig. 5 is a plan of a fragment of the chain carrying the scoring tool.

Fig. 6 is a partial vertical longitudinal section through the chain and scoring-tool, taken substantially on the line 6—6 of Fig. 5.

Fig. 7 is a transverse vertical section through the chain, taken substantially on the line 7—7 of Fig. 5.

Fig. 8 is a partial side elevation of one of the chain-guides showing one of the automatic switches mounted thereon.

Fig. 9 is a transverse vertical section taken substantially on the line 9—9 of Fig. 8.

Fig. 10 shows a wiring diagram for the cutter-operating motor, the magnetic clutch and brake, and the automatic switches.

Figure 1:
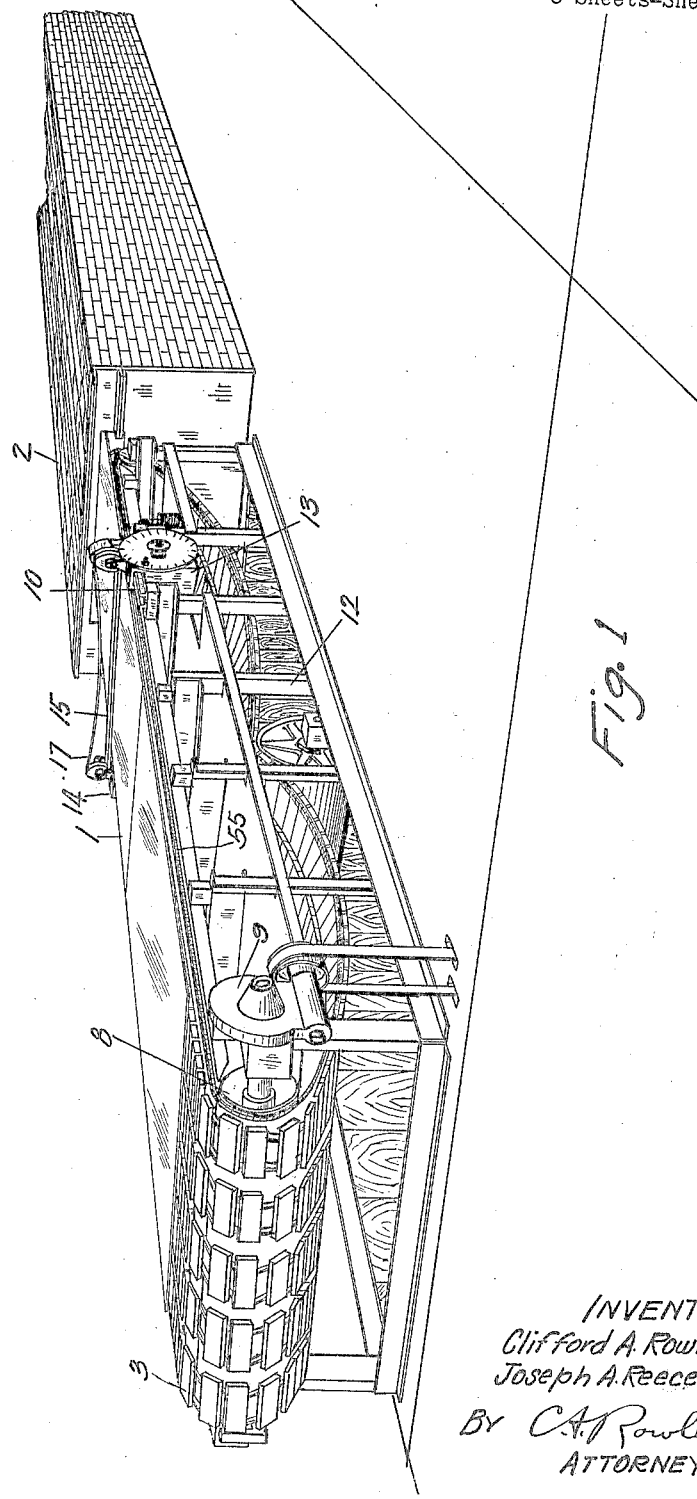
Fig. 1 is a perspective view of the end of the leer, and the cutting table, with the improved scoring apparatus installed thereon.

Referring first to Figs. 1 to 4, the flat continuous sheet of glass 1 comes out from the end of the leer 2, onto the moving supporting table or conveyor 3, which moves at the same speed as the sheet of glass. This table 3 may take a variety of forms, but is here shown as comprising a series of parallel endless chains 4, carrying a series of wood blocks 5, which form in the upper runs of the chains a flat even supporting table for the glass sheet. Each chain has a series of rollers 6 which roll in their upper run on supporting tracks 7. The chains are carried at their ends by rollers or sprockets 8, one of which is driven by any suitable means, as shown at 9, (Fig. 1), to move the table in the same direction and at the same speed as the sheet 1. The form of conveying table 3, just described, is merely illustrative, many other forms of tables could be used, as the invention about to be described will operate with any table of the traveling endless belt type. It is customary, in former practice, to divide the endless sheet 1 into sections of the desired size, by manually drawing a scoring-tool, at intervals, across the moving sheet. Since the sheet is in motion, it is particularly difficult to make an accurate straight cut exactly at right-angles to the line of motion of the sheet. It is also difficult to accurately measure off the desired length of sheet between the successive score lines. After the sheet is scored it is broken along the scored line by inserting the hand or a tool beneath the edge of the sheet below the scored line, and slightly elevating the sheet.

The present invention is designed to automatically perform the above operations in a more accurate manner, thus saving both labor and glass. Mounted adjacent the sides of the conveyor table are short stationary rails 10 and 11. These rails are preferably mounted in any convenient manner on the stationary framework 12, which supports the cutting table 3. These rails 10 and 11 extend parallel to each other and to the direction of travel of the table 3. They need not be very long, as the total travel of the cutter carriage which moves thereon will never be over a few inches. These rails may be of any desired type besides the one illustrated, and may take the form of slide-rods working in closely fitting apertures in the carriage now about to be described. This carriage comprises a main carriage portion 13, mounted on the rails 10 at one side of the table, a secondary carriage portion 14 mounted on the rails 11 at the other side of the table, and a connecting bridge member 15 rigidly uniting the two carriage portions so that the entire carriage or bridge structure may move forward with the sheet of glass carried by table 3, or may move back over the sheet in the opposite direction.

The glass cutters or scoring tools 16 and 16', (see Figs. 3, 4, 5, 6 and 7), are carried by an endless chain 17 which travels intermittently in one direction, as indicated by the arrows in Figs. 3, 4, 6 and 8. This chain may take a variety of forms, but is here illustrated as of the ordinary sprocket chain type, with rollers 18 mounted on the extended ends of the link connecting pintles 19. These rollers 18 are guided during the lower run of the chain, in the inwardly facing channels 20 which form the main portion of the bridge 15. In this way the chain is held against lateral twisting movement so that the scoring tools will be guided accurately along a straight line path. The channels 20 are carried at their ends in larger channels 21 and 22, secured to the carriage portions 13 and 14 respectively, see Figs. 3, 4 and 9.

The scoring tools 16 may be of the steel-wheel type as shown in Figs. 6 and 7, or may be diamonds. The stem 23 of each cutter 16 comprises an irregular tapered portion 24, fitting a corresponding aperture in washer 25 which slides in an irregular slideway 26 in a specially designed link 27 of chain 17. The upper rounded portion of stem 23 slides through a passage in the link 27, and its upper end is screw-threaded to receive a nut 28. A compression spring 29, within the link 27, bears down on the washer 25 to hold the tool yieldably down against the glass sheet 1, the extent of this downward movement being regulated by the adjusting nut 28. A worn tool 16 may easily be replaced, when the tool is on the upper return run of the chain, by simply removing the nut 28 and withdrawing the tool. The washer 25, spring 29 and nut 28 may be used indefinitely.

Figure 3:
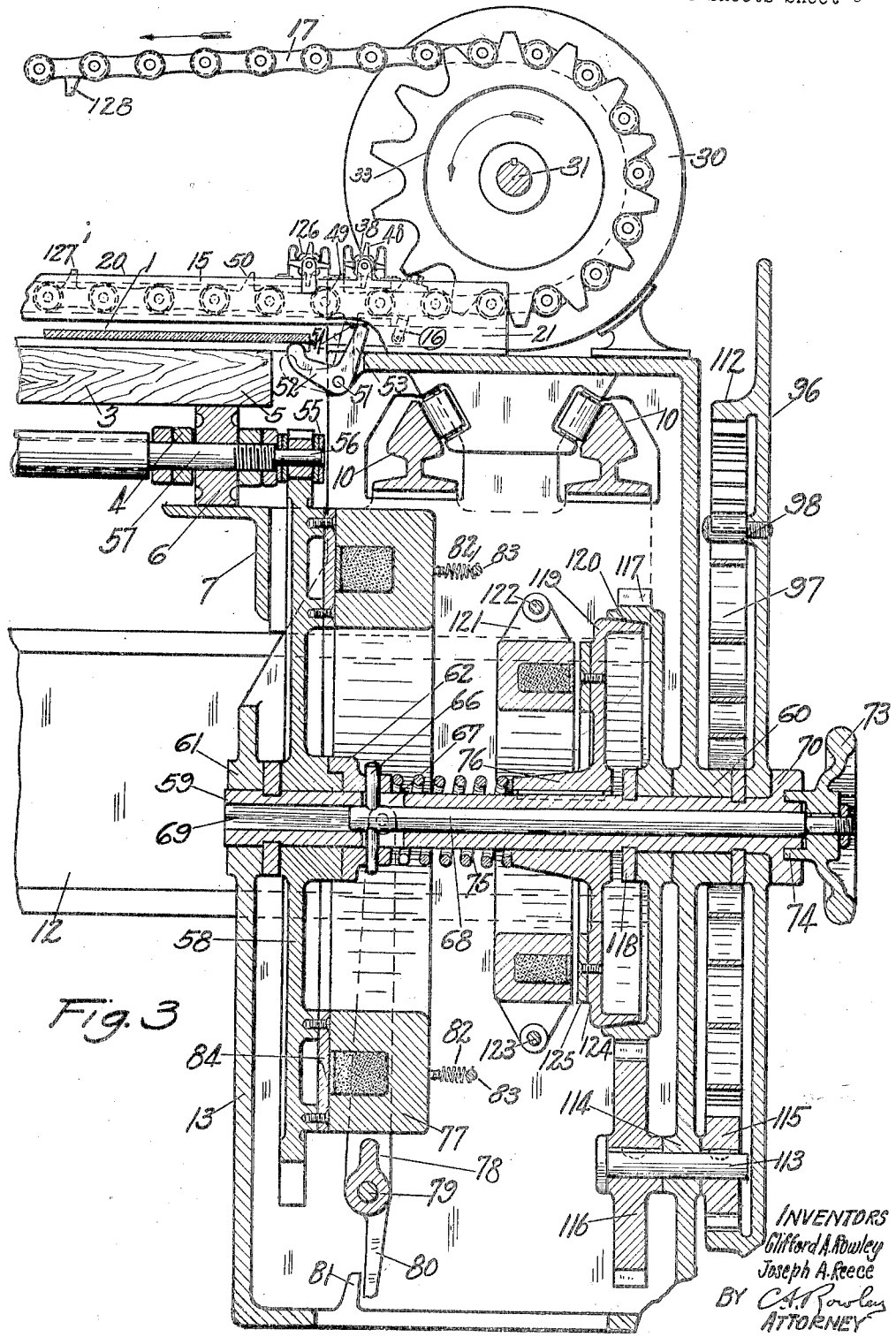
Fig. 3 is a partial vertical transverse section through the carriage, taken substantially on the line 3—3 of Fig. 2.

Mounted on top of carriage 13, is an electric motor 30, whose drive shaft 31 has an extended end mounted in bearing 32. The shaft 31 has keyed thereto a pair of driving sprockets 33, suitably spaced apart to engage the two rows of rollers 18 on the chain 17. At its other end the chain loop is carried by a similar pair of sprockets 34, mounted for free rotation in bearings 35 on a carriage 36, mounted for sliding movement in a direction lengthwise of the chain on carriage 14. The position of carriage 36 on carriage 14 is adjusted by screw 37; in this way the chain 17 may be tightened when necessary. The scoring tools 16 and 16' are mounted at equally spaced intervals on the chain 17. As shown in Figs. 3 and 4, the tool 16 has just completed a working trip from left to right across the sheet 1 and will next be carried up around the sprockets 33. The tool 16' has just completed the idle run from right to left, and is about to be carried down around sprockets 34 to make the next score line.

Means are provided to automatically stop the motor 30 just after either tool 16 or 16′ has completed a score line across the sheet of glass. This means comprises an automatic switch 38, which may be conveniently mounted on bridge 15 near the motor 30 as shown in Figs. 3 and 4. This switch 38 is shown in more detail in Figs. 8 and 9. A shaft 39 is revolubly mounted in ears 40 projecting up from channel 21. On this shaft is the revoluble make and break member 41, having four equally spaced concave recesses 42 in which bear a pair of spring contact arms 43. Two of the opposite recesses 42 contain contact plates 44 which are electrically connected as at 45. Circuit wires 46 and 47, hereinafter described, connect with the spring arms 43. A star-wheel 48 having four equally spaced arms, corresponding with the four recesses 42, is also secured to the shaft 39, in spaced relation to the contact block 41, so that it will lie in the path of lugs 49, 50, 49′ and 50′ carried by certain of the link members of chain 17. When one of these lugs moves past the automatic switch 38, it will engage one of the arms of the star-wheel 48 and turn the shaft 39 and the parts carried thereby through an angle of 90°. As shown in Figs. 3, 4, and 8, the motor is in operation and the tool 16 has nearly completed its working trip. The motor circuit is now completed through wire 46, one spring arm 43, contact plate 44, connection 45, the other plate 44, spring arm 43 and wire 47. It will be noted (Fig. 3), that lug 49 is spaced somewhat behind the tool 16, so that just after the tool has completed its lower trip and is about to turn around the sprockets 33, this lug 49 will engage and turn the star-wheel 48 through a quarter of a revolution. The spring arms 43 will snap into the blank pair of recesses 42, and the circuit is now broken and the motor and chain will stop. The motor is again started, to make the next score or cut, by means of a starting switch or circuit closer 85, which will be described later. Shortly after the motor and chain are again in motion the lug 50 (see Fig. 3) will engage the star-wheel 48 and turn the make and break member 41 through another 90° again completing the circuit through this switch 38. The other scoring-tool 16′ (see Fig. 4) will pass down around the sprockets 34 and across the sheet of glass from left to right making a second score line parallel to the one previously made by tool 16. It will be noted that the lugs 49′ and 50′ are spaced behind tool 16′ in the same relation that lugs 49 and 50 bear to tool 16. When tool 16′ has completed its cut the motor will be stopped by lug 49′ engaging the star-wheel 48 and turning it through another 90°. When the motor is again started, lug 50′ will turn the switch 38 through another quarter revolution so as to again complete the circuit, and the tool 16 will now make the third cut, starting a new cycle of operations.

Pivoted in the upper inner edge of the carriage 13 at 51, substantially in the same vertical plane with the path of travel of the cutting-tool, is a small bell-crank lever, having a lower arm 52 projecting beneath the edge of the sheet of glass 1, and an upper arm 53, slightly offset so as not to engage the tools 16 or 16′, but lying in the path of lugs 54 or 54′, on the chain 17, and spaced slightly behind the respective tools 16 and 16′. Just after either tool has completed its score, but before the chain is stopped, one of these lugs will engage the bell-crank and tilt it from its normal inoperative position (shown in dotted lines Fig. 3), to the active position as shown in full lines in Fig. 3. The arm 52 will now come up under the scored line and elevate the sheet 1 sufficiently to crack the sheet along the scored line. After the lug 54 or 54′ has passed, the bell-crank will drop back to its normal inoperative position as shown in dotted lines. If desired a light spring might be added to hold it in this position.

Figure 12:
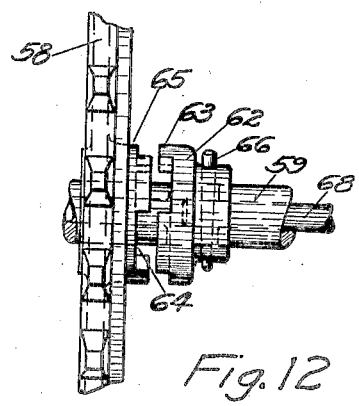
Fig. 12 is a side elevation of the locking clutch for the sprocket which drives the measuring device. The clutch is shown open.
Figure 13:
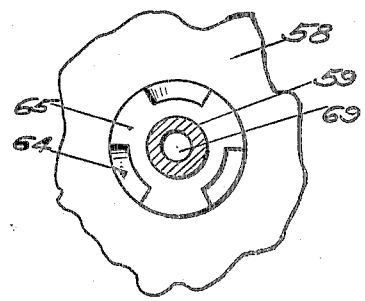
Fig. 13 is a front elevation of one of the clutch members.
Figure 14:
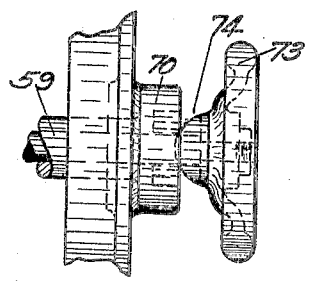
Fig. 14 is a side elevation of the operating wheel for the clutch, when the clutch is released as in Fig. 12.
Figure 15:
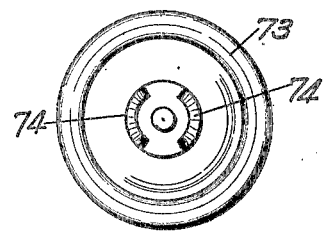
Fig. 15 is an inner elevation of this operating wheel.
Figure 16:
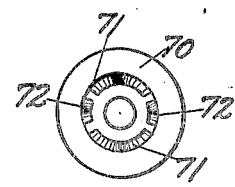
Fig. 16 is a front elevation of the boss on the shaft with which the clutch operating wheel cooperates.

Since the sheet 1 is moving while the cut or score is being made it is essential that the carriage and bridge, carrying the scoring tools, move with the sheet at this time, otherwise the cut will be along a diagonal line. Means are accordingly provided to lock the carriage to the sheet carrying table 3 while the cut is being made, and release it therefrom at the completion of the cut. Carried at one edge of the conveyor table 3 is a sprocket chain 55, best shown in Figs. 2 and 3. This chain may be conveniently mounted at intervals on extensions 56 of the pintles 57 of the outer chain unit of the conveyor. In the example shown three links of the chain 55 correspond to one link of the conveyor chain. This chain 55 virtually forms a rack along the edge of the table 3. Revolubly mounted in the carriage 13 is a sprocket-wheel or gear 58, which is always in mesh with chain 55. This sprocket is rotatably mounted on a shaft 59 which is journaled for rotation in bearings 60 and 61 in the front and rear walls of carriage 13. Although the sprocket 58 is mounted to rotate freely on shaft 59, it is normally held from rotation thereon by sliding clutch member 62 (see Figs. 3, 12 and 13), having teeth 63 engaging in recesses 64 in hub 65 of sprocket 58. Clutch member 62 is keyed to the shaft to rotate therewith but slide thereon, by means of pin 66 passing through the diametrical slot 67 in the shaft 59. This pin is also anchored in a slide-rod 68, which is longitudinally slidable in the central passage 69 extending through shaft 59 from end to end. The outer end of shaft 59 is enlarged as at 70 (Figs. 3, 14 and 16), and in its end face has a series of concentrically arranged concave recesses, comprising a pair of diametrically opposite deep recesses 71, and an intermediate pair of shallow recesses 72. On the reduced end of rod 68 is keyed an operating hand-wheel 73, having on its inner hub a pair of concentrically arranged diametrically opposite convex lugs or projections 74, adapted to cooperate with the recesses 71 or 72. An expansion spring 75 surrounds the shaft 59 and bears at one end on the clutch-member 62, and at its other end on a clutch member 76, which will be described hereinafter. This spring normally holds the clutch-member 62 in engagement with the sprocket 58 so that the shaft 59 is locked to and will turn with the sprocket 58. At this time lugs 74 lie within the deep recesses 71 in the enlarged head 70 of shaft 59. It will be noted that the sprocket 58, shaft 59, clutch-member 62, rod 68, and operating hand-wheel 73, all turn together as a unit. When it is desired (as explained later) to disconnect the shaft 59 from the sprocket 58, it is only necessary to grasp the wheel 73 and turn it through a quarter revolution relative to the shaft 59. The lugs 74 will ride up out of the deep recesses 71 and snap into the shallow locking recesses 72. This will draw the rod 68 to the right, (Fig. 3), and release the clutch from the sprocket. The sprocket can now run idly on the shaft 59, which will remain stationary. Since the sprocket and shaft only rotate at a very slow speed at any time, it will be easy to operate the wheel 73 to release the clutch although the parts are in motion.

Mounted concentrically with shaft 59, at one side of sprocket 58, is a stationary angular magnetic brake 77. This magnetic brake is pivotally carried at diametrically opposite points in a yoke 78, mounted on shaft 79 carried by the opposite side walls of the carriage 13. The brake tends to fall away slightly from the sprocket 58, this movement being limited by the engagement of lug 80 on yoke 78 with the fixed lug 81 on the bottom of carriage 13. This movement is also made positive and equal at all circumferential points by the small tension springs 82, connected at one end to brake 77 and at the other to fixed rods 83 in the carriage. An annular armature 84, for the brake, is secured to the sprocket 58. When the magnetic brake 77 is deenergized, the sprocket 58 will be continuously rotated by the continuously moving table 3 and sprocket chain 55, but since the sprocket may rotate freely in the carriage 13, the carriage and cutter mechanism carried thereby remain stationary. However, when the magnetic brake is energized it is drawn into locking engagement with the sprocket 58, which now cannot rotate. The teeth of this sprocket now in engagement with the chain 55 will lock the cutter-carriage to the chain 55 and cutting table 3, so that the carriage and scoring tools will travel with the table and the glass sheet 1 carried thereby. The carriage portions 13 and 14 and the bridge 15 will now travel along the rails 10 and 11.

Figure 11:
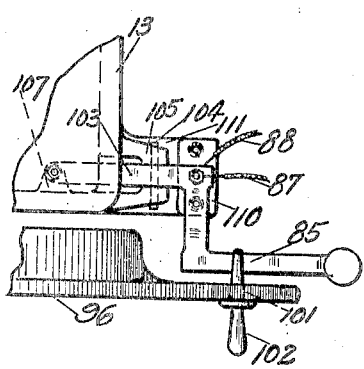
Fig. 11 is a plan of the circuit-closer which is either operated by hand or by the measuring disc.

The magnetic brake 77 is connected in a series circuit with the motor 30 and the switch 38, already described, as shown in Fig. 10. A hand-operated starting switch or circuit closer 85 is shunted around the switch 38. While this circuit closer 85 may be located at any convenient place on the machine and may be of any ordinary construction, it is here illustrated as a lever extension on an automatically operating switch, (see Figs. 3 and 11), to be described later.

Referring now to the wiring diagram shown in Fig. 10, when the parts are at rest, the switch 38 will be open. (It is shown closed in Fig. 10, since the scoring tool 16 is still in operation as shown in the various figures of the drawings.) If it is now desired to make a cut across sheet 1, the starting switch is closed momentarily by pressing down on lever 85. Current will now flow from the positive main through wire 86, motor 30, wire 46, wire 87, switch 85, wire 88, magnetic brake 77, wire 89, wire 132, wire 90, to the negative main. The motor will now operate to draw the cutter across the sheet and the magnetic brake will simultaneously lock the carriage to the cutting table. Since the next tool to operate (such as 16', Fig. 4) must first pass around the sprockets 34 before engaging the sheet, the brake has ample time to lock the carriage to the table, and have the parts all moving in unison, before the scoring tool commences to operate upon the sheet. Immediately after the motor has started, lug 50 will engage the star-wheel 48, as already described and return the switch 38 to circuit closing position. Switch 85 which has only been held down for an instant may now be released and the circuit will now be maintained from the positive main through wire 86, motor 30, wire 46, switch 38, wire 47, magnetic brake 77, wires 89, 132 and 90 to the negative main. The parts will continue to operate until the score has been completed when the lug 49 or 49' will engage the switch 38 and again open the circuit, stopping the motor and deenergizing the magnetic brake 77, and thus releasing the carriage from the table 3.

Figure 2:
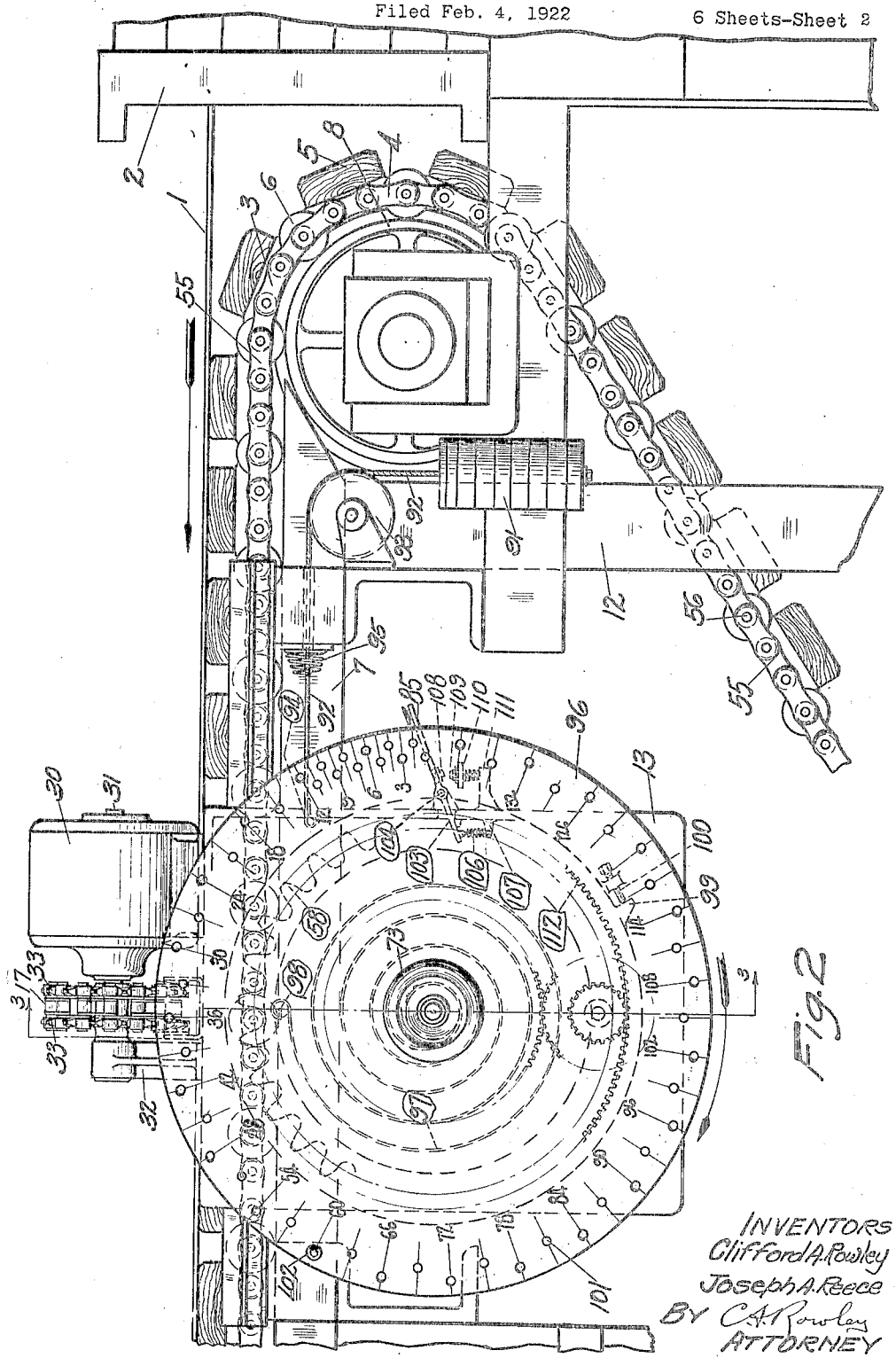
Fig. 2 is an end elevation of the cutter-carriage and the adjacent parts of the cutting-table.

An adjustable weight 91, see Fig. 2, is suspended from cable 92, passing over pulley 93 and connected to the carriage 13 as at 94. When the carriage is connected to and moves with the table 3, this weight will be drawn up, but when the carriage is released from the table, by releasing brake 77 from sprocket 58, the weight will automatically return the carriage to its initial position. A buffer spring 95, located between a portion of the frame 12 and the carriage 13, will take up the shock when the carriage is returned, although if the weight 91 is properly adjusted there need be no great shock, as the return may be made slowly, there being ample time between successive cutting operations for this return movement.

Means will now be described for automatically operating the starting switch 85 at fixed intervals to cut sheet sections of any desired length. A measuring disc 96 is rotatably mounted on the end of shaft 59, between the enlarged head 70 and the hub or bearing 60 on the front wall of carriage 13. A coil-spring 97 is connected at its inner end to the hub 60 and at its outer end to a pin 98 on the inner face of the disc. This spring tends to hold a lug 99 on the disc against an adjustable abutment-screw 100 on the carriage 13. (See dotted lines Fig. 2.) Whenever the disc is rotated in a clockwise direction, (by mechanism hereinafter described), it will be against the action of this spring, and the spring will always return the disc when released to the initial position with the lug 99 against the abutment 100. The disc will never be rotated through a complete 360° and the spring need not be a strong one, so the resistance of this spring will not be a material drag on the mechanism, nor will the return movement of the disc be violent.

The outer face of the disc near its circumference is suitably calibrated in inches to correspond to the linear travel of the glass sheet, and at each division there is an aperture 101 through the disc in which may be fitted a peg or key 102. (See Figs. 2, 4 and 11). This peg will be placed in the hole 101 corresponding to the length of sheet desired; as shown in Fig. 2, it is set for a 60 inch sheet section. This peg 102 is adapted to engage and operate the arm 85 of the starting switch, hereinbefore referred to. This switch comprises a lever 103 intermediately pivoted as at 104 to a bracket 105 on the carriage 13. The inner end of the lever 103 projects into the carriage and a tension spring 106 connects the end of the lever to a fixed lug 107 on the carriage body. The outer end of lever 103 carries one contact 108 of the switch, and the other contact 109 is carried by a spring supported plate 110, mounted on bracket 111 of carriage 13. The wires 87 and 88, previously referred to connect with the contacts 108 and 109, respectively. The arm 85 is an extension of lever 103, suitably positioned for operation either by hand or by the peg 102. The tension spring 106 keeps the contacts 108 and 109 separated except when the outer end of the lever is depressed by means of arm 85.

A large annular internal gear 112 is formed on the back of the measuring disc 96. This gear surrounds the spring 97 and acts as a protecting enclosure for same. A short stub-shaft 113 mounted in bearing 114 in the front wall of carriage 13, has keyed thereto at one end a pinion 115 meshing with the internal gear 112, and keyed to its other end is a spur-gear 116 meshing with a spur-gear 117 rotatably mounted on the shaft 59 between bearing 60 and a collar 118 keyed into the shaft 59. The gear 117 is normally clutched to the shaft 59 to rotate therewith, by means of the sliding clutch-member 76 hereinbefore referred to. This clutch-member 76 is keyed to the shaft 59 to slide thereon but rotate therewith and has a tapered friction clutch ring 119 adapted to engage in a tapered recess 120 in the gear 117. This friction clutch is normally held in active position by the expansion spring 75, already described, which bears at one end on the clutch member 76. An annular clutch operating magnet 121 is fixedly mounted, concentric with shaft 59, on cross rods 122 and 123 in the carriage. This magnet is mounted closely adjacent to the clutch-member 76, the vertical flange 124 of which carries an annular armature 125 for the magnet 121. When the magnet 121 is energized, the clutch-member will be slightly retracted against the spring 75, and the gear 117 will be released for free rotation on the shaft 59. The chain of gears 117, 116, 115 and 112 simply serve as reducing gearing between the shaft 59 and the disc 96. The reducing gears are so proportioned that less than 360° rotation of the disc 96, will correspond to the linear travel of table 3 for the greatest length of sheet to be cut. Of course the calibration on the face of disc 96 will depend upon the sizes of the gears used in this reducing train. It will be understood that the figures given on the face of the disc in Fig. 2 are merely illustrative.

The magnet 121 is wired up in a separate series circuit with an automatic switch 126, which is similar in all respects to the switch 38 already described in detail. This switch 126 may be mounted in any convenient location adjacent chain 17, but is shown in Figs. 3 and 4, as located alongside of but offset from the switch 38. Pairs of lugs 127, 128 and 127', and 128', (see Figs. 3 and 4), on the chain 17, are adapted to open and close this switch 126. As shown in Fig. 10, the current will flow from the positive main, through wire 86, wire 129, switch 126, wire 130, magnet 121, wires 131, 132, and 90 to the negative main. The lugs 127 and 128 (or 127' and 128') are so placed on the chain 17, that the magnet 121 will be energized for a few seconds, while the scoring tool is moving across the sheet of glass. At this time sprocket 58 and shaft 59 are locked against rotation and the gear 117 is not in motion. When magnet 121 is energized the gear 117 will be released from shaft 59, and the spring 97 which has been partially wound up, will rotate the disc 96 counter-clockwise until the lug 99 comes back against the abutment 100. At the same time the gears 115, 116 and 117 will be rotated along with the disc 96. When magnet 121 is again denergized, gear 117 is again clutched to the shaft 59, and the disc 96 will again be rotated in a clockwise direction through the gear-train when the sprocket 58 and shaft 59 are again released for rotation. An ordinary cut-out switch 130' may be located at any convenient point in the wire 130 (see Fig. 10), to throw the clutch 121 out of operation (when clutch 62 is out) if it be desired to operate the mechanism by hand for any long period of time. This switch 130' is usually unnecessary.

A complete cycle of operations of the mechanism will now be described. We will assume that the cutting-mechanism is standing idle, the wheel 73 having been turned to the position shown in Fig. 14, and the main clutch 62 released. However, the glass sheet carrying table 3 is in operation and the sprocket 58 is turning idly in the carriage 13. If it is desired to cut, (for example), 60 inch sheets, the peg 102 is placed in the hole labeled 60 as shown in Fig. 2. The wheel 73 is given a quarter turn, bringing it to the position shown in Fig. 3, thus locking the sprocket 58 to the shaft 59. The switch lever 85 may now be pressed down to make the first cut at any desired place on the sheet. The chain 17 and scoring tools will now be placed in motion, the sprocket 58 and all of the gearing in carriage 13 will be locked against rotation, and the carriage 13 will start to travel with the cutting table 3. As previously described, the lug 50 will immediately reset the switch 38 so that switch lever 85 may be released, and the circuit through the motor and brake will still be maintained. The scoring tool 16 or 16' starts across the sheet. While this score is being made, lug 127 or 127' engages the switch 126, moving it to circuit closing position and completing the circuit through magnet 121. Gear 117 will now be unclutched from the shaft 59, and the spring 97 will reset the disc 96 at its starting position with the lug 99 against stop-screw 100. Shortly thereafter lug 128 or 128' engages the switch 126, and breaks the circuit through magnet 121. Clutch 76 is now reset by spring 75 and the disc 96 is once more geared to the shaft 59, although the shaft is not yet in motion. Soon after the scoring tool 16 or 16' has completed the cut, lug 54 or 54' engages the arm 53 of the cracking-off device and the sheet is broken along the scored line. Immediately thereafter lug 49 or 49' operates the switch 38, breaking the circuit to the motor 30 and brake 77. The motor 30 and chain 17 stop, and the carriage 13 is released from the cutting table 3 and ceases its longitudinal travel, (to the left in Fig. 2). The sprocket 58 will now be rotated by the chain 55, and through shaft 58 and the train of gears will rotate the disc 96 slowly in a clockwise direction. The weight 91 will return the cutter-carriage to the starting position, during this return travel of the carriage the sprocket 58 will roll back along the chain 55 momentarily increasing the speed of rotation of the disc 96 to accord with increased relative speed between the carriage and the sheet of glass 1. The carriage is now stationary but the disc 96 continues to rotate until the peg 102 depresses the arm 85 of the starting switch. The carriage is now instantly locked to the cutting table and again moves therewith as before described. The motor again operates the cutting-tools. The disc 96 ceases to rotate and the switch 85 is held closed until the magnet 121 is again energized by the operation of switch 126. The disc 96 will then be reset by spring 97 and the circuit broken at switch 85, but in the meantime switch 38 has again been closed by lug 50 or 50' so that the main operating circuit remains closed until the score is completed. This cycle of events will automatically repeat itself indefinitely.

Whenever it is desired to change the length of sheet being cut, the peg 102 is transferred to the hole in the disc 96, corresponding to the new size of sheet. This may be done without stopping the operation of the machine. If at any time it is desired to cut out a narrow strip of glass, or a sheet of any length less than that for which the machine is then set, it is only necesasry to depress the lever 85 by hand, when that portion of the sheet where the cut is desired comes beneath the bridge 15. The machine will then immediately commence to measure sheets as before, from this last score line.

The accuracy of the calibrated measuring disc may be adjusted by means of the screw 100, which will vary the starting position of the disc.

It will be seen that this device, if left alone, will be entirely automatic in its operation, and will continue to cut sheets of a given size until reset by the attendant. At the same time, scores or cuts may be made at any desired locations on the sheet by manipulating a hand switch, without disturbing the automatic measuring device which will immediately resume its operations as soon as the machine is again left to itself. The machine may be thrown out of operation entirely at any time by merely giving a 90° turn to the hand-wheel 73.

Claims:

1. In combination with a conveyor for carrying a sheet of glass longitudinally, an automatic apparatus for transversely cutting the glass sheet, comprising a cutting tool, a carrier for the tool, means for drawing the tool across the sheet, means for moving the carrier with the sheet while the cutter is operating, and means for returning the parts to the starting position.

2. In combination with a conveyor for carrying a sheet of glass longitudinally, an automatic apparatus for transversely cutting the glass sheet, comprising a cutting tool, a carrier for the tool, means for drawing the tool across the sheet, means for moving the carrier with the sheet while the cutter is operating, and a timing mechanism for repeating the cycle of operations at spaced intervals.

3. In combination with a conveyor for carrying a sheet of glass longitudinally, an automatic apparatus for transversely cutting the glass sheet, comprising a cutting tool, a carrier for the tool, means for drawing the tool across the sheet, means for moving the carrier with the sheet while the cutter is operating, and an adjustable timing mechanism for repeating the cycle of operations at spaced intervals.

4. The combination with a glass sheet supporting table, of parallel rails mounted at the opposite sides of the table, a bridge spanning the table transversely and movably mounted on the rails, a glass cutter carried by the bridge comprising an endless chain or belt, and a scoring tool carried by the chain.

5. The combination with a moving table for carrying a glass sheet, of parallel rails mounted at the opposite sides of the table, a bridge spanning the table transversely and movably mounted on the rails, and a glass cutter carried by the bridge comprising an endless chain or belt, and a scoring tool carried by the chain.

6. The combination with a glass sheet supporting table, of parallel rails mounted at the opposite sides of the table, a bridge spanning the table transversely and movably mounted on the rails, and a glass cutter carried by the bridge comprising an endless chain or belt, a scoring tool carried by the chain, and means for driving the chain.

7. The combination with a glass sheet supporting table, of parallel rails mounted at the opposite sides of the table, a bridge spanning the table transversely and movably mounted on the rails, and a glass cutter carried by the bridge comprising an endless chain or belt, a pair of scoring tools mounted at equally spaced intervals on the chain, and means for driving the chain intermittently in one direction.

8. The combination with a glass sheet supporting table, of parallel rails mounted at the opposite sides of the table, a bridge spanning the table transversely and movably mounted on the rails, and a glass cutter carried by the bridge comprising an endless chain or belt, a pair of scoring tools mounted at equally spaced intervals on the chain, and an electric motor for driving the chain intermittently in one direction.

9. The combination with a glass sheet supporting table, of parallel rails mounted at the opposite sides of the table, a bridge spanning the table transversely and movably mounted on the rails, and a glass cutter carried by the bridge comprising an endless chain or belt, a pair of scoring tools mounted at equally spaced intervals on the chain, a motor for driving the chain in one direction, and an automatic switch for stopping the motor after either scoring tool has made one complete traverse of the table.

10. The combination with a glass sheet supporting table, of parallel rails mounted at the opposite sides of the table, a bridge spanning the table transversely and movably mounted on the rails, and a glass cutter carried by the bridge comprising an endless chain or belt, a pair of scoring tools mounted at equally spaced intervals on the chain, a motor for driving the chain in one direction, a switch for stopping the motor, and a pair of lugs for operating the switch, a lug being carried by the chain in such spaced relation to each scoring tool that the switch will be operated just after the tool has completed a traverse of the table.

11. The combination with a longitudinally movable glass sheet supporting table, of stationary parallel rails mounted at opposite sides of the table, a carriage movably mounted on the rails and comprising a bridge spanning the table transversely, a glass cutter carried by the bridge comprising an endless chain or belt, a scoring tool carried by the chain, and automatic means for locking the carriage to the table while the cutting operation is being performed.

12. The combination with a longitudinally movable glass sheet supporting table, of stationary parallel rails mounted at opposite sides of the table, a carriage movably mounted on the rails and comprising a bridge spanning the table transversely, a glass cutter carried by the bridge comprising an endless chain or belt, a scoring tool carried by the chain, means for driving the chain, and automatic means for locking the carriage to the table while the cutting operation is being performed.

13. The combination with a longitudinally movable glass sheet supporting table, of stationary parallel rails mounted at opposite sides of the table, a carriage movably mounted on the rails and comprising a bridge spanning the table transversely, a glass cutter carried by the bridge comprising an endless chain or belt, a pair of scoring tools mounted at equally spaced intervals on the chain, means for driving the chain intermittently in one direction, and automatic means for locking the carriage to the table while the cutting operation is being performed.

14. The combination with a longitudinally movable glass sheet supporting table, of stationary parallel rails mounted at opposite sides of the table, a carriage movably mounted on the rails and comprising a bridge spanning the table transversely, a glass cutter carried by the bridge comprising an endless chain or belt, a pair of scoring tools mounted at equally spaced intervals on the chain, a motor for driving the chain intermittently in one direction, and automatic means for locking the carriage to the table while the cutting operation is being performed.

15. The combination with a longitudinally movable glass sheet supporting table, of stationary parallel rails mounted at opposite sides of the table, a carriage movably mounted on the rails and comprising a bridge spanning the table transversely, a glass cutter carried by the bridge comprising an endless chain or belt, a pair of scoring tools mounted at equally spaced intervals on the chain, a motor for driving the chain in one direction, an automatic switch for stopping the motor after either scoring tool has made one complete traverse of the table, and automatic means for locking the carriage to the table while the cutting operation is being performed.

16. The combination with a longitudinally movable glass sheet supporting table, of stationary parallel rails mounted at opposite sides of the table, a carriage movably mounted on the rails and comprising a bridge spanning the table transversely, a glass cutter carried by the bridge comprising an endless chain or belt, a pair of scoring tools mounted at equally spaced intervals on the chain, a motor for driving the chain in one direction, a switch for stopping the motor, a pair of lugs for operating the switch, a lug being carried by the chain in such spaced relation to each scoring tool that the switch will be operated just after the tool has completed a traverse of the table, and automatic means for locking the carriage to the table while the cutting operation is being performed.

17. The combination with a glass sheet supporting table, of parallel rails mounted at opposite sides of the table, a carriage movably mounted on the rails comprising a bridge spanning the table transversely, a glass cutter carried by the bridge comprising an endless chain or belt, a scoring tool carried by the chain, means for driving the chain, and a cracking-off device comprising a bell-crank lever pivoted on the carriage with one arm adapted to project under a glass sheet carried by the table, and a lug carried by the chain for engaging with the other arm of the bell-crank.

18. The combination with a glass sheet supporting table, of parallel rails mounted at opposite sides of the table, a carriage movably mounted on the rails comprising a bridge spanning the table transversely, a glass cutter carried by the bridge comprising an endless chain or belt, a pair of scoring tools mounted at equally spaced intervals on the chain, means for driving the chain intermittently in one direction, and a cracking-off device comprising a bell-crank lever pivoted to the carriage with one arm adapted to project under a glass sheet carried by the table, and a pair of lugs carried by the chain in spaced relation to the scoring tools, one of the lugs engaging the other arm of the bell-crank just after the completion of a sheet traverse by one of the scoring tools.

19. The combination with a glass sheet supporting table, of parallel rails mounted at opposite sides of the table, a carriage movably mounted on the rails comprising a bridge spanning the table transversely, a glass sheet cutter carried by the bridge, and an automatic cracking-off device carried by the carriage and actuated by the cutter to crack off the sheet just after a score is completed.

20. The combination with a longitudinally movable table for conveying sheet glass, of stationary parallel rails mounted at the sides of the table, a carriage movable on the rails comprising a bridge spanning the table at right angles to its direction of travel, a glass cutter movable transversely of the table and carried by the bridge, and means connecting the carriage to the table to move therewith during the cutting operation and releasing the carriage from the table when the cutting operation is completed.

21. The combination with a longitudinally movable table for conveying sheet glass, of stationary parallel rails mounted at the sides of the table, a carriage movable on the rails comprising a bridge spanning the table at right angles to its direction of travel, a glass cutter movable transversely of the table and carried by the bridge, means connecting the carriage to the table to move therewith during the cutting operation and releasing the carriage from the table when the cutting operation is completed, and means for returning the carriage to its starting position when released from the table.

22. The combination with an endless longitudinally movable table for conveying sheet glass, of parallel stationary rails mounted at the sides of the table, a carriage movable on the rails comprising a bridge spanning the table at right angles to its direction of travel, a glass cutter carried by the bridge and movable transversely of the table, an endless sprocket chain secured to one edge of the table and moving therewith, a sprocket wheel freely pivoted on the carriage and meshing with the sprocket chain, and a brake for holding the sprocket against rotation while the cutter is operating.

23. The combination with an endless longitudinally movable table for conveying sheet glass, of parallel stationary rails mounted at the sides of the table, a carriage movable on the rails comprising a bridge spanning the table at right angles to its direction of travel, a glass cutter carried by the bridge and movable transversely of the table, an endless sprocket chain secured to one edge of the table and moving therewith, a sprocket wheel freely pivoted on the carriage and meshing with the sprocket chain, and a magnetic brake for holding the sprocket against rotation while the cutter is operating.

24. The combination with an endless longitudinally movable table for conveying sheet glass, of parallel stationary rails mounted at the sides of the table, a carriage movable on the rails comprising a bridge spanning the table at right angles to its direction of travel, a glass cutter carried by the bridge and movable transversely of the table, an endless sprocket chain secured to one edge of the table and moving therewith, a sprocket wheel freely pivoted on the carriage and meshing with the sprocket chain, a motor for operating the glass cutter, and a magnetic brake for holding the sprocket against rotation while the cutter is operating, the brake and motor being in series circuit and simultaneously energized.

25. The combination with a longitudinally movable table for conveying sheet glass, of a carriage mounted above the table for movement parallel to the direction of travel of the table, a cutting device on the carriage for scoring the sheet transversely, means for automatically locking the carriage to the table to move therewith while the score is being made, and means to return the carriage to starting position.

26. The combination with a longitudinally movable table for conveying sheet glass, of a carriage mounted above the table for movement parallel to the direction of travel of the table, a cutting device on the carriage for scoring the sheet transversely, means for automatically locking the carriage to the table to move therewith while the score is being made, means to return the carriage to starting position, and automatic measuring means for timing the cutting intervals to cut sheets of any desired size.

27. The combination with a longitudinally movable table for conveying sheet glass, of a carriage mounted above the table for movement parallel to the direction of travel of the table, a cutting device on the carriage for scoring the sheet transversely, means for automatically locking the carriage to the table to move therewith while the score is being made, means to return the carriage to starting position, and automatic measuring means operating through the locking device for timing the cutting intervals to cut sheets of any desired size.

28. The combination with a longitudinally movable table for conveying sheet glass, of a carriage mounted above the table for movement parallel to the direction of travel of the table, a cutting device on the carriage for scoring the sheet transversely, a rack carried by the table, a locking gear pivoted on the carriage and meshing with the rack, and a brake for holding the gear against rotation while the cutter is operating.

29. The combination with a longitudinally movable table for conveying sheet glass, of a carriage mounted above the table for movement parallel to the direction of travel of the table, a cutting device on the carriage for scoring the sheet transversely, a rack carried by the table, a locking gear pivoted on the carriage and meshing with the rack, a brake for holding the gear against rotation while the cutter is operating, a measuring disc journaled on the carriage and geared to the locking gear and adjustable timing means operated by the disc for governing the operations of the cutter.

30. The combination with a longitudinally movable table for conveying sheet glass, of a carriage mounted above the table for movement parallel to the direction of travel of the table, a cutting device on the carriage for scoring the sheet transversely, a rack carried by the table, a locking gear pivoted on the carriage and meshing with the rack, a brake for holding the gear against rotation while the cutter is operating, a measuring disc journaled on the carriage, gear connections including a clutch between the locking gear and disc, adjustable timing means operated by the disc for governing the operations of the cutter, means operated by the movement of the cutter for releasing the clutch, and means operable when the clutch is released for resetting the measuring disc.

31. The combination with a longitudinally movable table for conveying sheet glass, of a carriage mounted for movement parallel to the table, a cutting tool on the carriage movable transversely across the glass sheet, and means connecting the carriage to the table while the cutting tool is operating.

32. The combination with a longitudinally movable table for conveying sheet glass, of a carriage mounted for movement parallel to the table, a cutting tool on the carriage movable transversely across the glass sheet, means connecting the carriage to the table while the cutting tool is operating, and means for returning the carriage to starting position when released from the table.

33. The combination with a longitudinally movable table for conveying sheet glass, of a carriage mounted for movement parallel to the table, a cutting tool on the carriage movable transversely across the glass sheet, a motor for operating the cutting-tool, and a brake connecting the carriage to the table while the motor is operating.

34. The combination with a longitudinally movable table for conveying sheet glass, of a carriage mounted for movement parallel to the table, a cutting tool on the carriage movable transversely across the glass sheet, a motor for operating the cutting-tool, a brake connecting the carriage to the table while the motor is operating, and means for returning the carriage to starting position when released from the table.

35. The combination with a longitudinally movable table for conveying sheet glass, of a carriage mounted for movement parallel to the table, a cutting tool on the carriage movable transversely across the glass sheet, an electric motor for operating the cutting-tool, and a magnetic brake in circuit with the motor for locking the carriage to the table while the motor is operating.

36. The combination with a longitudinally movable table for conveying sheet glass, of a carriage mounted for movement parallel to the table, a cutting tool on the carriage movable transversely across the glass sheet, an electric motor for operating the cutting-tool, a magnetic brake in circuit with the motor for locking the carriage to the table while the motor is operating, and means for returning the carriage to starting position when released from the table.

37. The combination with a longitudinally movable table for conveying sheet glass, of a carriage mounted for movement parallel to the table, a cutting tool on the carriage movable transversely across the glass sheet, an electric motor for operating the cutting-tool, a magnetic brake in circuit with the motor for locking the carriage to the table while the motor is operating, means for returning the carriage to starting position when released from the table, and a timing mechanism for operating the motor at spaced intervals.

38. The combination with an endless longitudinally moving table for conveying sheet glass, of parallel stationary rails at the sides of the table, a carriage movable on the rails comprising a bridge spanning the table at right angles to its direction of travel, a sheet scoring device carried on the bridge, a motor for operating the scoring device, an endless sprocket chain secured to one edge of the conveyor table and moving therewith, a sprocket on the carriage meshing with this chain, a rotary shaft on the carriage on which the sprocket is mounted, a magnetic brake for the sprocket, a measuring disc rotatably mounted on the shaft, a starting switch for the motor and brake, adjustable means on the disc for operating the switch, a spring tending to hold the disc in one position, a gear freely rotatable on the shaft, a magnetically operated clutch for clutching this gear to the shaft, a train of gears connecting the first gear to the disc, and circuit-breakers operable by the scoring device for controlling the magnetic brake, clutch and motor.

39. The combination with an endless longitudinally moving table for conveying sheet glass, of parallel stationary rails at the sides of the table, a carriage movable on the rails comprising a bridge spanning the table at right angles to its direction of travel, an endless chain carried on the bridge, a motor for intermittently driving the chain in one direction, a pair of sheet scoring devices mounted on the chain at equally spaced intervals, an endless sprocket chain secured to one edge of the conveyor table and moving therewith, a sprocket on the carriage meshing with this chain, a rotary shaft on the carriage on which the sprocket is mounted, a magnetic brake for the sprocket, a measuring disc rotatably mounted on the shaft, a starting switch for the motor and brake, adjustable means on the disc for operating the switch, a spring tending to hold the disc in one position, a gear freely rotatable on the shaft, a magnetically operated clutch for clutching this gear to the shaft, a train of gears connecting the first gear to the disc, and circuit-breakers operable by the chain which carries the scoring devices for controlling the magnetic brake, clutch and motor.

40. The combination with an endless longitudinally moving table for conveying sheet glass, of parallel stationary rails at the sides of the table, a carriage movable on the rails comprising a bridge spanning the table at right angles to its direction of travel, an endless chain carried on the bridge, a motor for intermittently driving the chain in one direction, a pair of sheet scoring devices mounted on the chain at equally spaced intervals, an endless sprocket chain secured to one edge of the conveyor table and moving therewith, a sprocket on the carriage meshing with this chain, a rotary shaft on the carriage on which the sprocket is rotatably mounted, a clutch for normally securing the sprocket to the shaft to rotate therewith, a magnetic brake for the sprocket, a measuring disc rotatably mounted on the shaft, a starting switch for the motor and brake, adjustable means on the disc for operating the switch, a spring tending to hold the disc in one position, a gear freely rotatable on the shaft, a magnetically operated clutch for clutching this gear to the shaft, a train of gears connecting the first gear to the disc, and circuit-breakers operable by the chain which carries the scoring devices for controlling the magnetic brake, clutch and motor.

Signed at Toledo, in the county of Lucas and State of Ohio, this 2d day of February, 1922.

CLIFFORD A. ROWLEY.
JOSEPH A. REECE.